R. W. E. HAYES.
CULTIVATOR.
APPLICATION FILED SEPT. 7, 1916.

1,293,769.

Patented Feb. 11, 1919.
2 SHEETS—SHEET 1.

Witness:
Harry S. Gaither

Inventor:
Ralph W. E. Hayes
by Banning & Banning
Attys.

R. W. E. HAYES.
CULTIVATOR.
APPLICATION FILED SEPT. 7, 1916.
1,293,769.
Patented Feb. 11, 1919.
2 SHEETS—SHEET 2.
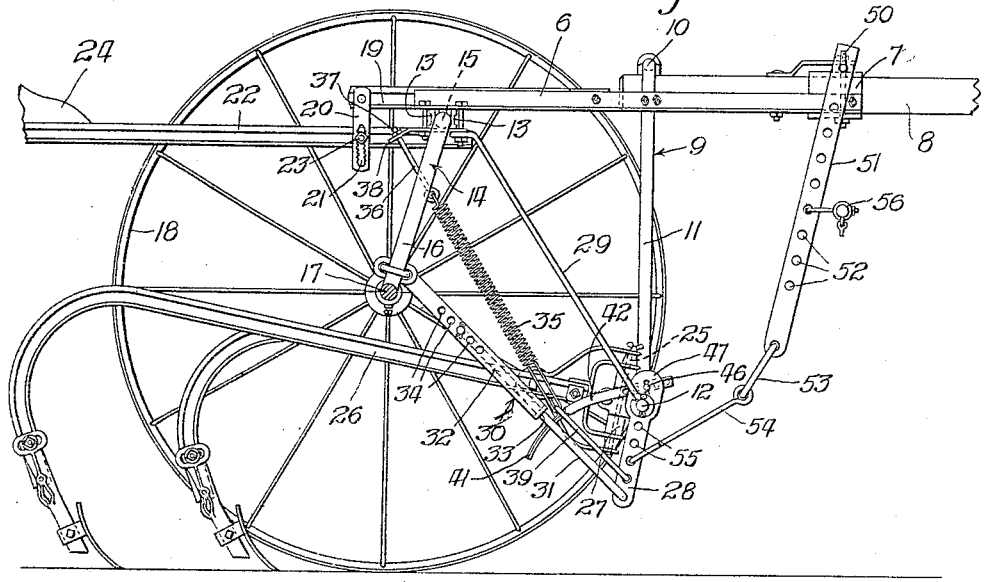
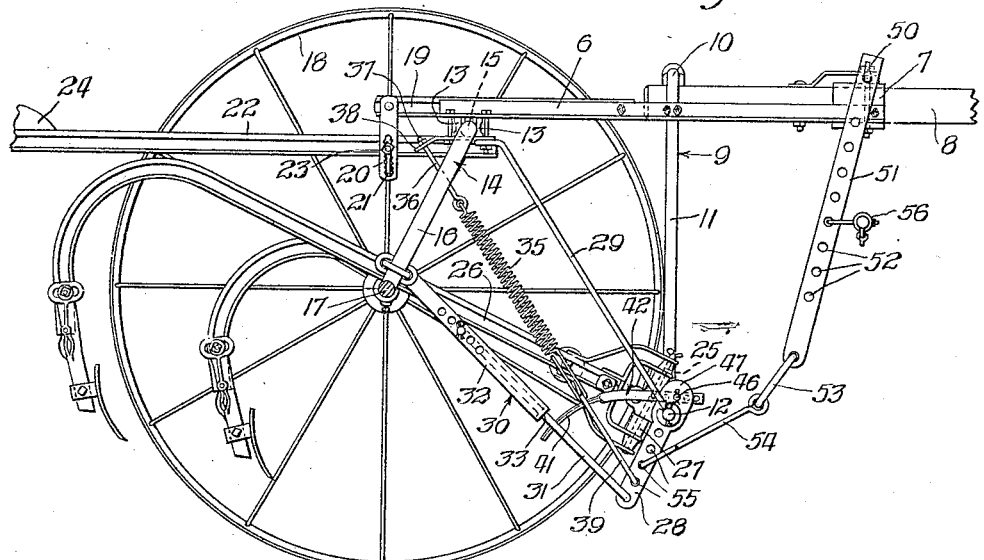
Witness:
Harry S. Gaither
Inventor:
Ralph W. E. Hayes
by Banning & Banning
Attys.

UNITED STATES PATENT OFFICE.

RALPH W. E. HAYES, OF GALVA, ILLINOIS, ASSIGNOR OF ONE-HALF TO HAYES PUMP & PLANTER COMPANY, OF GALVA, ILLINOIS, A CORPORATION OF ILLINOIS.

CULTIVATOR.

1,293,769.  Specification of Letters Patent.  Patented Feb. 11, 1919.

Application filed September 7, 1916. Serial No. 118,862.

*To all whom it may concern:*

Be it known that I, RALPH W. E. HAYES, a citizen of the United States, residing at Galva, in the county of Henry and State of Illinois, have invented certain new and useful Improvements in Cultivators, of which the following is a specification.

This invention relates to cultivators, and is concerned with numerous features of construction, chief among which is the means used for balancing the gangs.

In the present invention, I have sought to produce a balanced cultivator of simple construction and free of such parts as levers, chains, and ratchets; a cultivator which may be used as a combined rider and walker; a cultivator in which the gangs are balanced automatically; and a cultivator in which the wheels may be moved forwardly or rearwardly to change the point of support of the frame, thus balancing the cultivator for a light or heavy rider, as required. These and other objects of my invention will more fully hereinafter appear from the specification and claims, and from the drawings in which—

Fig. 2 is a cross-section through the cultivator taken at a plane immediately adjacent the inner side of one of the wheels, and showing in elevation the operative parts of the cultivator, the gangs being lowered close to the ground;

Fig. 3 is a view similar to Fig. 2, the gangs in this figure being elevated from the ground;

Figure 1:
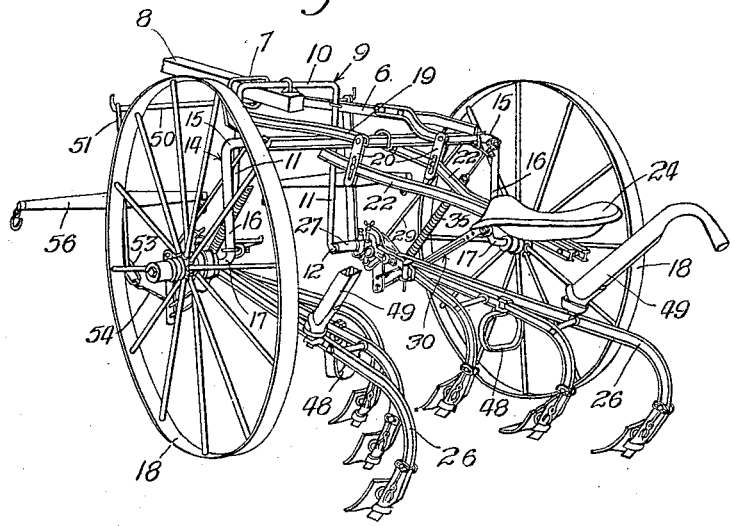
Figure 1 is a perspective view of a cultivator constructed in accordance with the present invention.

The present cultivator is provided with a frame consisting of a pair of angle irons 6 which are joined at their forward ends to a member 7 to which a tongue 8 may be attached. Rearwardly of the member 7 a bar 9 of generally inverted U-shape is secured to the frame, this bar consisting of a horizontal intermediate section 10 beneath which the end of the tongue 8 finds support, and parallel sections 11 extending down to a point below the level of the frame irons 6. The extremities 12 of the two sections 11 are each outwardly turned in a horizontal direction to provide pivotal mountings for the gangs as will presently be described. The rearward ends of the frame irons are joined to companion bars 13, spaced slightly apart and extending transversely across the frame beneath the irons 6. Between these transverse bars 13 two axles 14 are clamped in place, each axle consisting of a horizontal upper portion 15, a portion 16 at right angles thereto and normally disposed in a generally vertical direction, and a lower horizontal portion 17 upon which a wheel 18 is mounted. Each of the two axles is alike, and capable of moving between the transverse bars 13 in such a manner that the position of each wheel may be moved with independence of the other relatively forwardly or rearwardly of the frame.

Figure 7:
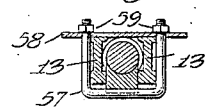
Fig. 7 is a cross section taken on line 7—7 of Fig. 6.
Figure 6:
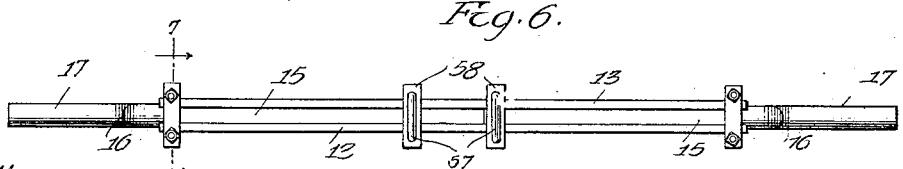
Fig. 6 is a plan view of the axle construction, the associated parts of the cultivator being detached.

The clamps which act to hold the axles 14 between the bars 13 are best shown in Figs. 6 and 7, and comprise U-bolts 57 arranged to encircle the two bars 13 on three sides, and on the fourth side to engage with a plate 58 by means of suitable nuts 59.

Extension irons 19 are secured one to each of the frame irons and extend to a point rearwardly of the frame, being supported upon the transverse bars 13. At their rear extremities each of these extension irons carries a strap 20 consisting of pivotally mounted companion arms, each formed with a slot 21, the walls of which are undulated to provide alternately narrow and wide portions throughout the length of each slot. Between the companion arms of each strap 20 a seat supporting bar 22 is extended, being supported within the strap by means of a bolt or pin 23 which extends through the bar 22 and through opposite registering enlarged portions in the slots 21. It will be understood from Fig. 1 that two of these seat supporting bars 22 are provided, one for each of the straps 20. The forward ends of these bars rest beneath the transverse bars 13, while the rearward ends are joined together to support the seat 24 at a point which is at the extreme rear end of the cultivator. As the bolt or pin 23 can find rest in any one of several of the enlarged portions of the slots 21, it is obvious that the height of the seat 24 is capable of adjustment at will.

By means of a bolt or pin 25, a gang 26 is pivotally secured to a coupling 27, one of which is pivotally mounted upon each of the extremities 12 of the bar 9. The gangs are thus enabled to swing independently either vertically or horizontally. Each coupling 27 is provided at its outer end with a crank arm 28, the position of which changes in accordance with the vertical position of the gang connected therewith. To render secure and immovable the position of the bar sections 12 relative to the frame, I have provided brace rods 29, one upon each side of the cultivator frame.

The construction so far outlined obviously does not include any means for balancing the frame upon the wheels, nor any means for balancing the gangs upon the frame. In the present invention, the means used for balancing the wheels and gangs are closely inter-related, and may best be understood when explained together.

Figure 4:
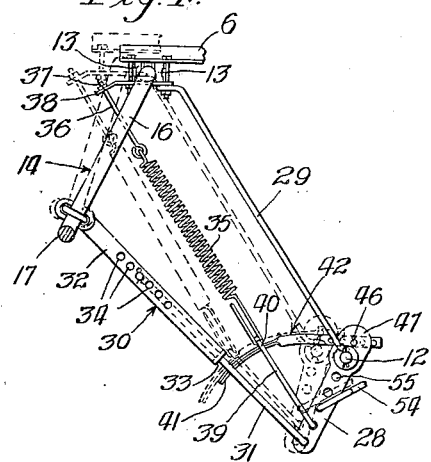
Fig. 4 is a fragmentary view in elevation of the self-balancing parts of the cultivator.

Connecting the free end of each crank arm 28 with the lower portion 17 of the axle proximate thereto is an adjustable link 30. This link consists of two arms 31 and 32, the former of which may be pivoted to the extremity of the crank arm, as shown. The arm 31 is arranged also to extend through a lip 33 at the end of the arm 32 and to engage with any one of several holes 34 formed therein for the purpose of adjusting the link 30 to any required length. The distance between the axle 14 and the free end of the crank arm is thus determined by adjustment of the link 30 which, in turn, determines the angular position of each of the axle portions 16 relative to the angle of the crank arm 28 connected therewith. It follows also that vertical swinging of the gangs upon the extremities 12 of the bar 9 affects, through the medium of the crank arms 28, the links 30, and the axles 14, the longitudinal position of the frame relative to the wheels, or vice versa. In Fig. 4 the full and dotted lines indicate the different positions assumed by the parts under discussion when a change is made in the angle of the crank arms.

Figure 5:
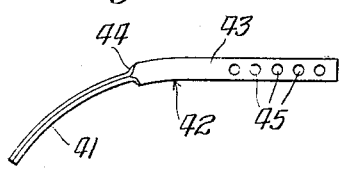
Fig. 5 is an enlarged view of the stop arm.

As the gangs are heavy and require support, I have provided for each a spring 35 connected at its upper end with a link 36 which is locked by means of a nut 37 to a support 38 extending slightly rearwardly of the transverse bars 13. It is apparent that the tension of the spring may be altered at will by adjusting the position of the nut relative to the link 36 upon which it is threaded. The lower end of the spring is connected also with another link 39 which is hooked through an opening in the crank arm 28. The connection between the spring and the link 39 is preferably formed by providing an eye 40 in the link through which the end of the spring is hooked. The narrow portion 41 of a stop arm 42 is also passed through the eye 40 of the link 39. This stop arm is provided also with a widened portion 43, the juncture of the narrow and wide portions forming a shoulder 44. It is intended that the narrow portion may freely move within the eye, and for this purpose it is curved in the form of an arc, as best shown in Fig. 5. A plurality of holes 45 are formed in the widened portion 43, through any one of which a bolt or pin 46 may be passed to lock the stop arm to an extended portion 47 of the crank arm 28. When arranged in the manner described, the weight of the gangs which tends to swing the crank arm counter clockwise (in the views exhibited in Figs. 2, 3, and 4) will cause (1) the wheels to be moved forwardly with respect to the frame (or vice versa) through the medium of the adjustable link 30; (2) a stretching of the springs 35, the tension of which operates to sustain the gangs in balanced condition off the ground; and (3) the stop arm to be moved within the eye 40 until the shoulder 44 engages therewith, whereupon a lateral force is exerted against the spring such as to accelerate its tension. This accelerated tension upon the spring provides for balancing the gang when it has lowered to a given point. This point of accelerated tension, moreover, may be adjusted by locking the bolt or pin 46 through any one of the holes 45, thus determining the distance through which the crank arm must move before the stop arm shoulder 44 engages with the spring. The balancing of the gangs may, furthermore, be adjusted by adjusting the link 30 to a length which will normally maintain the axle portions 16 at a desired angle. Inasmuch as the cultivator frame augmented by the weight of the driver (when the machine is used as a rider) will bear down heavily upon the wheels, any deviation of the axle portions 16 from the vertical will tend to raise the gangs. The proper angle for securing the desired balance of the gangs may, therefore, be obtained by adjusting the link 30 to the length required.

Foot straps 48 are also provided upon the gangs to be used by the driver for the purpose of raising or lowering the gangs as required during cultivation, this foot control, however, being simplified and rendered easy by the balancing means heretofore described. When the present cultivator is used as a walker, handles 49 are attached to the gangs as shown in Fig. 1. On account of the balancing means used, the elevation of the gangs may be easily controlled through the handles 49.

Attached to the member 7 at the forward end of the cultivator is an equalizing bar 50 supporting at each of its ends a vertical draft bar 51 provided with a series of openings 52 therein. By means of links 53 and 54, the lower end of each draft bar is hooked to any one of several openings 55 in the proximate crank arm 28. To each of the draft bars 51 draft appliances 56 are attached, to which traces may be fastened when a team is hitched to the cultivator.

It will be observed that, in this draft construction, the pull is from the lower part of the machine, and that the tongue serves principally to guide the cultivator. The draft, moreover, proceeds from points on the crank arms 28 which are connected with the gangs. When the machine is in operation, there is a downward pull upon the gangs proportionate to the draft exerted as the cultivator is hauled over the ground. As previously explained, the gangs are floated or balanced in such a way that the tension of the supporting springs 35 is increased greatly when the stop arm engages therewith. Manifestly when the draft causes the gangs to be lowered to the point where the stop arms engage with the springs, the increased tension will check further lowering of the gangs in the manner previously explained.

The cultivator of the present invention I have shown to be self-balancing and leverless; it is also a combined rider and walker. The cultivator is, furthermore, automatically balanced by lowering or raising the gangs. The adjustable links enable the wheels to be moved forward or backward, thus changing the point of support of the frame, and this, in turn, balances the cultivator for a light or heavy driver, or for use as a walking cultivator, as may be required. The same movement that balances the cultivator is utilized, moreover, to raise the gangs. Likewise it is to be observed that the depth of plowing can be quickly regulated by adjusting the stop arm to engage with the spring at any point desired.

I claim:

1. In a cultivator, the combination of a frame, axles and wheels for supporting the frame at a point above the center of the wheels, each axle being independently arranged to swing with respect to the frame, whereby the position of the wheels may be moved longitudinally thereof, gangs pivotally mounted upon the frame, an arm secured to each gang mounting and arranged to be moved when the gangs are raised or lowered, a rigid connection adjustably arranged between each arm and one wheel axle whereby the distance therebetween is maintained constant, and tension means connecting each arm with the frame for supporting the gangs, said means serving also to normally maintain the wheels rearwardly of the point of frame support, substantially as described.

2. In a cultivator, the combination of a frame, axles and wheels for supporting the frame at a point above the center of the wheels, each axle being independently arranged to swing with respect to the frame, whereby the position of the wheels may be moved longitudinally thereof, gangs pivotally mounted upon the frame, an arm secured to each gang mounting and arranged to be moved when the gangs are raised or lowered, a rigid connection adjustably arranged between each arm and one wheel axle whereby the distance therebetween is maintained constant, and tension means connecting each arm with the frame for supporting the gangs, substantially as described.

3. In a cultivator, the combination with a frame of gang balancing mechanism consisting of a pivotal support for each gang located in fixed relation to the frame, two swinging axles each with a wheel thereon for supporting the frame, an arm carried by each gang mounting and arranged to swing with vertical movement of the gang, rigid link connections between each arm and the swinging end of one axle, and tension means connecting each arm with the frame for normally sustaining the gangs in balanced relation, substantially as described.

4. In a cultivator, the combination with a frame of gang balancing mechanism consisting of a pivotal support for each gang located in fixed relation to the frame, two swinging axles each with a wheel thereon for supporting the frame, an arm carried by each gang mounting arranged to swing with vertical movement of the gang, a rigid link connection between each arm and the swinging end of one axle, a spring connecting each arm with the frame for normally sustaining the gangs in balanced relation, and means for adjusting the tension of each spring for balancing the gang at any desired elevation, substantially as described.

5. In a cultivator, the combination with a frame of gang balancing mechanism consisting of a pivotal support for each gang located in a fixed relation to the frame, two swinging axles each with a wheel thereon for supporting the frame, an arm carried by each gang mounting arranged to swing with vertical movement of the gang, a rigid adjustable connection between each arm and the swinging end of one axle for determining the normal inclination of the axle, and tension means connecting each arm with the frame for normally sustaining the gangs in balanced relation, substantially as described.

6. In a cultivator, the combination with a frame of gang balancing mechanism consisting of a pivotal support for each gang located in a fixed relation to the frame, two swinging axles each with a wheel thereon for supporting the frame, an arm carried by the gang mounting arranged to swing with vertical movement of the gang, a rigid link connection between each arm and the swinging end of one axle, a spring connecting each arm with the frame for normally sustaining the gangs in balanced relation, and means for accelerating the tension of each spring when the gang influenced thereby has descended to a given elevation, substantially as described.

7. In a cultivator, the combination with a frame of gang balancing mechanism consisting of a pivotal support for each gang located in a fixed relation to the frame, a swinging axle with wheels thereon for supporting the frame, an arm carried by the gang mounting arranged to swing with vertical movement of the gang, a rigid link connection between each arm and the swinging end of one axle, a spring connecting each arm with the frame for normally sustaining the gangs in balanced relation, and means for accelerating the tension of each spring when the gang influenced thereby has descended to a given elevation, consisting of an element carried by the arm and arranged to engage with the spring to deflect the same out of its normally operating position, substantially as described.

RALPH W. E. HAYES.

Witnesses:
 RAY WALKER,
 H. O. MCCREIGHT.

Copies of this patent may be obtained for five cents each, by addressing the "Commissioner of Patents, Washington, D. C."